(12) United States Patent
Moobed

(10) Patent No.: US 8,291,143 B1
(45) Date of Patent: Oct. 16, 2012

(54) SINGLE LINE COMMUNICATION

(75) Inventor: Pedman Moobed, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 85 days.

(21) Appl. No.: 12/369,641

(22) Filed: Feb. 11, 2009

(51) Int. Cl.
*G06F 13/42* (2006.01)
*H05K 7/10* (2006.01)
*H04L 7/00* (2006.01)

(52) U.S. Cl. .................... 710/106; 710/301; 713/400

(58) Field of Classification Search .............. 710/58, 710/61, 301–302, 105–106; 713/375, 400
See application file for complete search history.

(56) References Cited

U.S. PATENT DOCUMENTS

| | | | |
|---|---|---|---|
| 5,040,193 A * | 8/1991 | Leonowich et al. | 375/333 |
| 5,237,322 A * | 8/1993 | Heberle | 340/870.13 |
| 5,696,994 A * | 12/1997 | Pang | 710/64 |
| 5,808,871 A * | 9/1998 | Rosecan et al. | 361/730 |
| 5,892,797 A * | 4/1999 | Deng | 375/361 |
| 6,608,571 B1 * | 8/2003 | Delvaux | 341/53 |
| 2002/0166040 A1 * | 11/2002 | Crane et al. | 712/33 |
| 2003/0007339 A1 * | 1/2003 | Harris et al. | 361/788 |
| 2003/0035473 A1 * | 2/2003 | Takinosawa | 375/224 |
| 2003/0061559 A1 * | 3/2003 | Peyser et al. | 714/758 |
| 2003/0163607 A1 * | 8/2003 | Lee | 710/1 |
| 2004/0150973 A1 * | 8/2004 | Junkins et al. | 361/801 |
| 2004/0208200 A1 * | 10/2004 | Hejdeman et al. | 370/476 |
| 2004/0233917 A1 * | 11/2004 | Rocas et al. | 370/395.62 |
| 2006/0290396 A1 * | 12/2006 | Jiang | 327/158 |
| 2007/0036095 A1 * | 2/2007 | Fuhrmann et al. | 370/282 |
| 2007/0096941 A1 * | 5/2007 | Morys | 340/853.1 |
| 2007/0133310 A1 * | 6/2007 | Sorrells et al. | 365/189.02 |
| 2009/0077193 A1 * | 3/2009 | Parris et al. | 709/209 |
| 2009/0182799 A1 * | 7/2009 | Huang | 709/201 |
| 2009/0259739 A1 * | 10/2009 | Cartes et al. | 709/223 |
| 2009/0307336 A1 * | 12/2009 | Hieb | 709/220 |
| 2010/0272156 A1 * | 10/2010 | Park et al. | 375/142 |

OTHER PUBLICATIONS

"AU5790 Single wire CAN transceiver". Application Note AN2005. Philips Semiconductors. Apr. 16, 2001.*
Murphy, Niall. "A short trip on the CAN bus". Online Aug. 11, 2003. Retrieved from Internet Mar. 4, 2011. <http://www.eetimes.com/General/DisplayPrintViewContent?contentItemId=4024614>.*
'Interface' in "The Free On-Line Dictionary of Computing". Online May 22, 1996. Retrieved from Internet Mar. 1, 2012. <http://foldoc.org/interface>.*

* cited by examiner

*Primary Examiner* — Thomas J Cleary

(57) ABSTRACT

A system and method for communication over a single communication line. The system includes an interface logic component for sending and receiving information for a processing component. The system further includes a single line interface module for sending and receiving data over a single communication line. The single line interface module uses a preamble for sending and recovering a clock signal for sending and receiving data over the single communication line.

19 Claims, 10 Drawing Sheets

400

Flowchart 700

SINGLE LINE COMMUNICATION

BACKGROUND

As computer systems have become increasingly advanced the ability of the different components to communicate has become increasingly important. Correspondingly each component requires a physical medium, typical physical wires or traces, to communicate. As the number of components increases having traces between each component can quickly occupy an increased amount of space and increase cost as manufacturing complexity increases. Thus, each pin on a connector is a scarce and valuable resource.

One particular instance where the number of connections and corresponding complexity is of particular important is a backplane. A backplane typically has several connectors for connecting multiple card based components and each connector allows the various card based components to communicate with one another. For each connector, the pins of the connector are used to connect the card based components to the each other. Typically, as many of the connectors pins as possible are used for high bandwidth applications.

Correspondingly, each use of a connector pin for communication restricts the pin to use for other purposes. For example, redundancy is often required such that pins of a connector need to be used for signaling related to status and health of card based components instead for other communication between the card based components. The use of several pins on a backplane connector for the status and health information is not a particularly efficient use of scarce connector resources.

Each pin added means the connector has to be increased in size and requires additional routing increasing cost. Further, adding more routing wire may necessitate adding a layer to the backplane increasing cost and complexity. Upgrading or making a new backplane is problematic because backplane based systems currently in use would need to be disassembled to have a new backplane installed. Moreover, current card based components may not be able to operate with the increase capacity backplane connector. Thus, the inconvenience upgrading and cost of manufacturing make utilizing each pin or trace on a backplane as efficiently as possible highly desirable.

SUMMARY

Accordingly, embodiments of the present invention provide a system and method for single line messaging (SLM) allowing communication via a single communication wire or connector pin. Embodiment of the present invention further provide for transmitter and receiver clock synchronization via a preamble, multiple acknowledgements, and collision avoidance.

In one embodiment, the present invention is implemented as a method for sending information. The method includes sending a preamble over a single communication wire, which is operable to be used for recovering a clock signal. A destination and a source identifier may then be sent over the single communication wire. The method further includes sending a data message over the single communication wire. The message may include data in packet form. Error correction information may then be sent to be used to determine if the message was received correctly.

In another embodiment, the present invention is implemented as a method for receiving information. The method includes receiving a preamble over a single communication wire and used by a receiving device for recovering a clock signal. A destination and a source identifier may then be received over the single communication wire, the source identifier thereby identifies the device that data is to be received from. Upon receiving the destination identifier, a first acknowledgement may be sent over the single communication wire which corresponds to being able to receive a message. The message may then be received over the single communication wire which may include packetized data. Error correction information is then received over the single communication wire and used to check the correct receiving of the message. A second acknowledgement may then be sent over the single communication wire indicating the message was correctly received.

In this manner, embodiments of the present invention provide a serial messaging protocol for communication of multiple devices over a single communication wire. The use of the single communication wire conserves valuable connector pins and backplane resources. Embodiments of the present invention may facilitate redundant operation of networking system.

In another embodiment, the present invention is implemented as a system for communicating information. The system includes an interface logic component operable to send and receive information from a processing component and an optional transmit buffer for receiving data from the processing component to be sent. The system further includes an optional receive buffer operable for receiving data for the processing component and a single line interface module for sending and receiving data over a single communication wire. The single line interface module uses a preamble for sending and recovering a clock signal for sending and receiving data over the single communication wire.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

FIG. 1 is a block diagram of an exemplary computer system which embodiments of the present invention may operate with.

DETAILED DESCRIPTION

Figure 1:
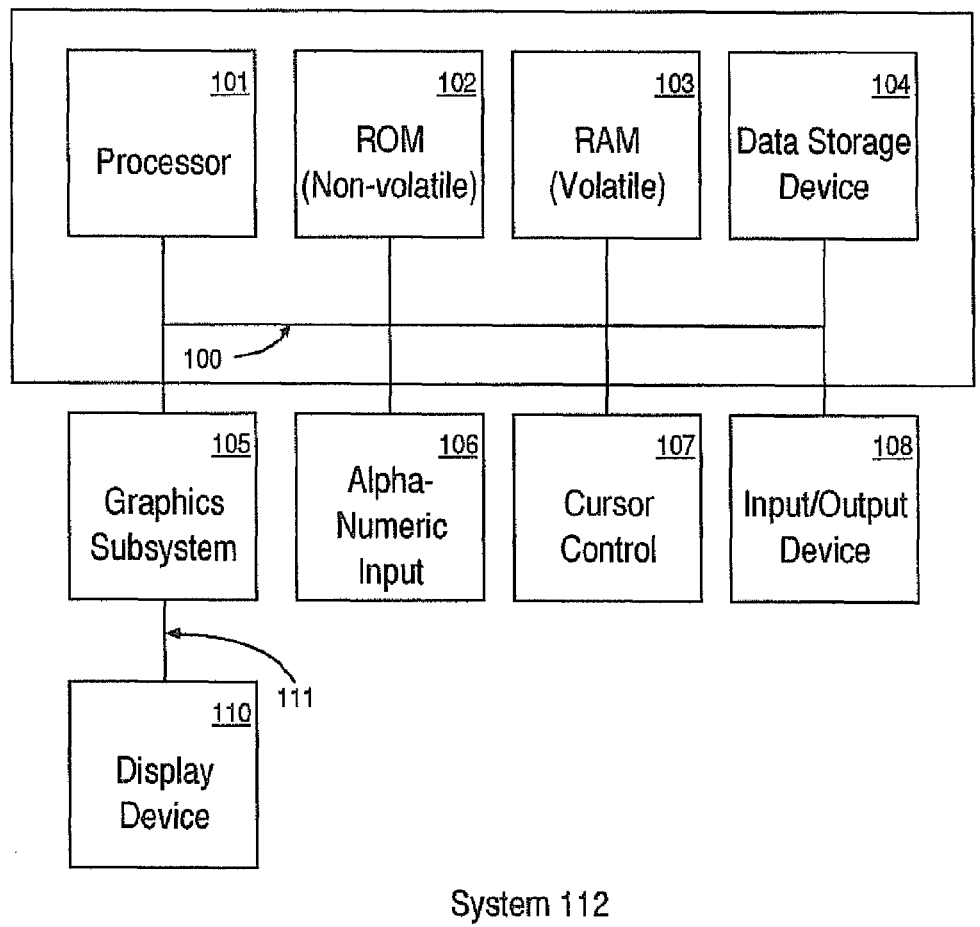

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "operating," "changing," "yielding," "assuming," "exchanging," "associating, "switching," "designating," "implementing," "attempting," "permitting," "increasing," "decreasing," "monitoring," "checking," "comparing" or the like, refer to the actions and processes of a computer system, or similar electronic computing device (e.g., a routing device such as a router or switch), that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. Examples include, but are not limited to, networking devices, routers, switches, load balancers, and application switching devices.

With reference to FIG. 1, an exemplary system for implementing embodiments includes a general purpose computing system environment, such as computing system 112. In its most basic configuration, computing system 112 typically includes at least one processing unit 101 and memory, and an address/data bus 100 (or other interface) for communicating information. Depending on the exact configuration and type of computing system environment, memory may be volatile (such as RAM 102), non-volatile (such as ROM 103, flash memory, etc.) or some combination of the two. Computer system 112 may also comprise an optional graphics subsystem 105 for presenting information to the computer user, e.g., by displaying information on an attached display device 110, connected by a video cable 111. Additionally, computing system 112 may also have additional features/functionality. For example, computing system 112 may also include additional storage (removable and/or non-removable) including, but not limited to, magnetic or optical disks or tape. Such additional storage is illustrated in FIG. 1 by data storage device 104. Computer storage media includes volatile and nonvolatile, removable and non-removable media implemented in any method or technology for storage of information such as computer readable instructions, data structures, program modules or other data. RAM 102, ROM 103, and data storage device 104 are all examples of computer storage media.

Computer system 112 also comprises an optional alphanumeric input device 106, an optional cursor control or directing device 107, e.g., a mouse, and one or more signal communication interfaces (input/output devices, e.g., a network interface card) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network).

Figure 2:
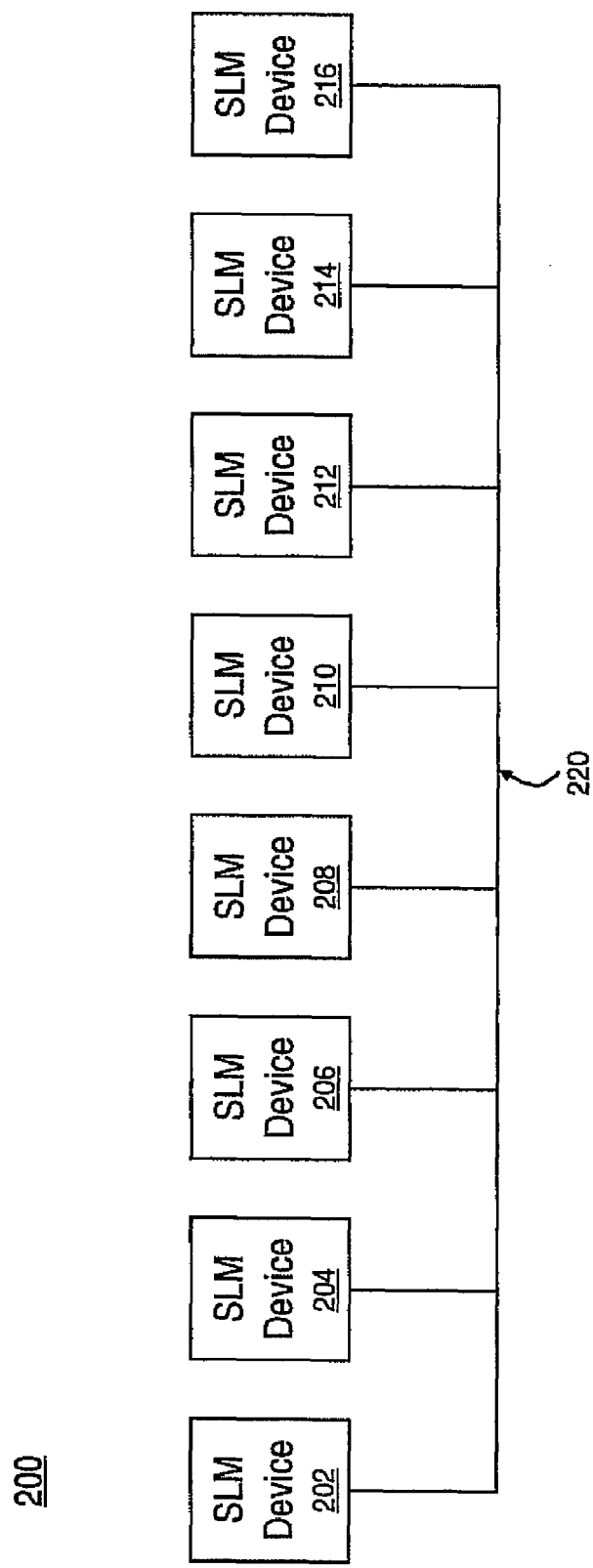
FIG. 2 is a block diagram of an exemplary operating environment of multiple systems in accordance with an embodiment.

FIG. 2 is block diagram of an exemplary operating environment of multiple systems in accordance with an embodiment. Exemplary operating environment 200 includes single line messaging (SLM) devices 202-216 and single communication line 220. It is appreciated that single communication line 220 may be any single line communication medium coupling multiple devices (e.g., a wire). It is noted that the number of SLM devices in exemplary operating environment 200 is exemplary and it is appreciated that the number of devices is limited only on the bits used for identification or addressing and thus may be scaled as desired to any number of devices. For example, if three bits are used for addressing, eight devices may coupled and communicate over the single communication line 220. In one embodiment, SLM devices 202-216 communicate asynchronously via single communication line 220.

SLM devices may be used for communication within and/or with a variety of devices including, but not limited to, portable devices (e.g., cellphone, PDA, portable audio/video devices, etc.), direct broadcast satellite (DBS)/terrestrial set-top box, video game consoles, embedded computing devices, display devices, audio systems, network communication systems, telephone communication systems, and computing systems.

Figure 3:
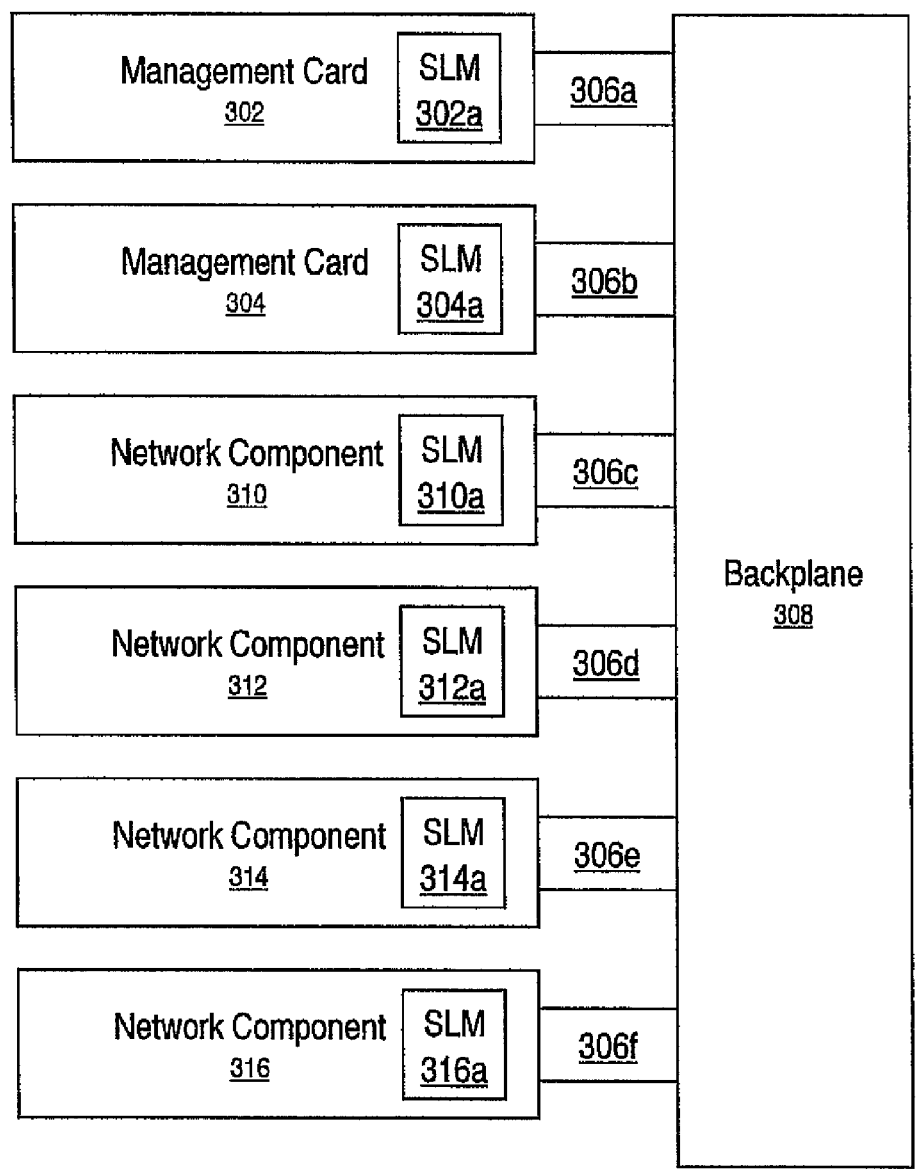
FIG. 3 is a block diagram of another exemplary operating environment in accordance with an embodiment of the present invention.

FIG. 3 is a block diagram of another exemplary operating environment in accordance with an embodiment of the present invention. Operating environment 300 may perform various networking functions including, but not limited to, network switch functionality (e.g., layer 2: logical link layer, layer 3: internet protocol (IP) address, layers 4-7: application specific). Operating environment 300 includes management cards 302-304, backplane 308, and network components 310-316. Network components 310-316 may be a variety of devices including, but not limited to, line cards. Backplane 308 includes backplane connectors 306a-f operable for coupling management cards and network components 310-316. Each of management cards 302-304 and network components 310-316 includes respective SLM devices 302a, 304a, and 310a-316a for facilitating communication between each card or component. In one embodiment, SLM devices 302a, 304a, and 310a-316a facilitate sideband communication between management cards 302-304 and network components 310-316 separate from network functionality.

In one embodiment, management cards 302-304 manage network traffic among network components 310-316. Embodiments of the present invention may facilitate communication between management cards 302-304 via backplane 308. More specifically, embodiments of the present invention may allow management cards 302-304 to communicate various information for implementing redundancy including, but not limited to, heartbeat or alive signals, configuration information, and software upgrades (e.g., firmware).

For example, management cards 302-304 can communicate status or health to each other and switch between active and standby based on the status communicated. That is, one management card manages network traffic while the other is in standby. Thus, if management card 302 is managing network traffic and is having issues, management card 302 can communicate settings (e.g., tables and configuration files) to prepare management card 304 to be ready to switch over to active status. SLM devices 302a and 304a may thus facilitate hot failover between management cards 302 and 304.

It is appreciated that the conditions under which management cards 302-304 switch status from standby to active may be a user configurable option. It is further appreciated that SLM devices 302a and 304a provide sideband communication which does not impact the communication between management cards 302-304 and network components 310-316 which utilize numerous connector pins due to the high bandwidth required for network traffic management.

SLM devices 302a and 304a further facilitate hitless upgrades. For example, a software image can be communicated from one management card to another management card without impacting or interfering with network traffic management or taking a management card offline. For example, SLM devices 302a and 304a may allow a software upgrade of management card 304 while management card 302 manages network traffic. Management cards 302 and 304 may each then change respective active/standby status to allow management card 302 to be upgraded. The SLM devices thereby allow management card in standby mode upgraded. The software image may include a variety of software including, but not limited to, firmware upgrades, operating systems, etc.

In one embodiment, SLM devices do not require initialization and are ready for communication on power up. In contrast, more complex communication formats or interfaces (e.g., PCI Express) perform various configurations on power up delaying readiness for communication. It is appreciated that such power on configuration processes can be affected by hardware or software failure and thus having a sideband communication via SLM device allows switch over to a standby management card if there is a failure during configuration.

Figure 4:
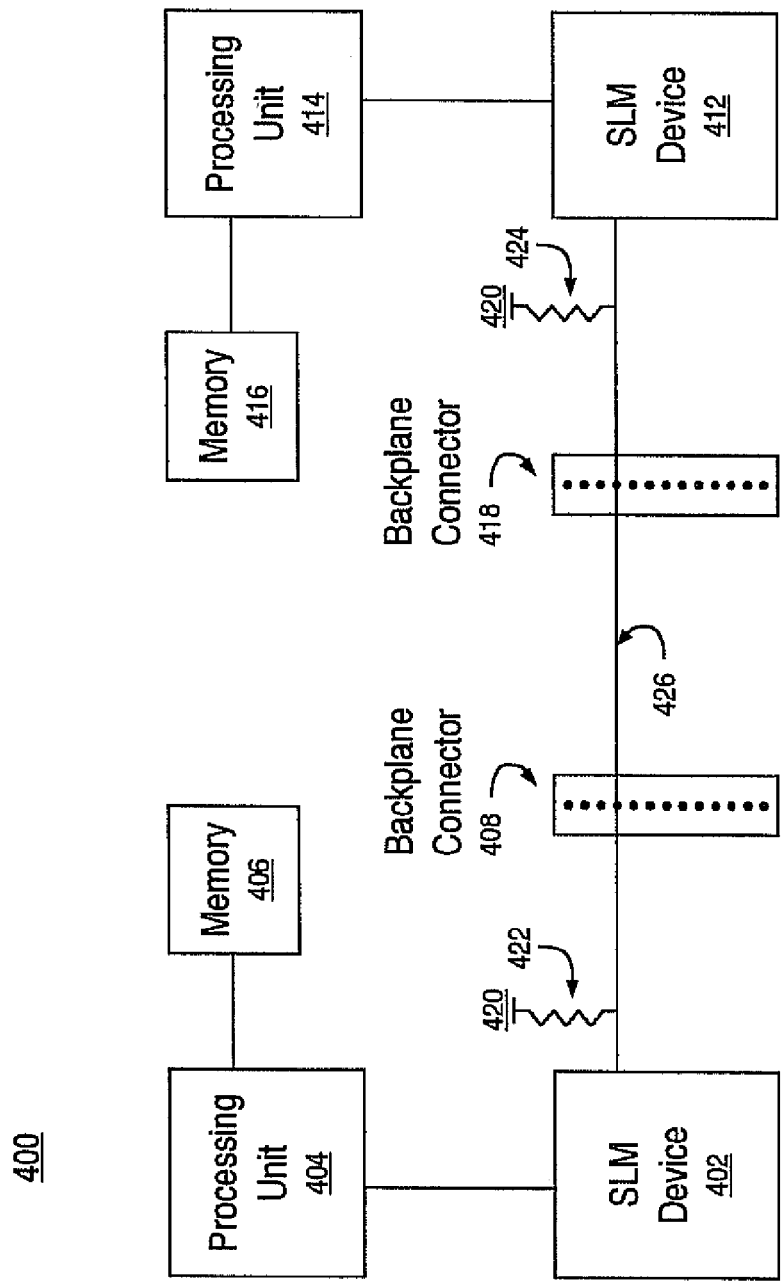
FIG. 4 is another block diagram of an exemplary operating environment in accordance with an embodiment.

FIG. 4 is another block diagram of an exemplary operating environment in accordance with an embodiment. Operating environment includes single line messaging (SLM) devices 402 and 412, processing units 404 and 414, memory 406 and 416, backplane connectors 408 and 418, pull up resistors 422 and 424, voltage source 420, and single communication wire 426.

Processing units 404 and 414 may be a variety of devices or processing components including, but not limited to, a central processing unit (CPU), programmable device, control logic field-programmable gate array (FPGA), microcontroller, or embedded system. In one embodiment, processing units 404 and 414 facilitate the functionality of network management cards (e.g., network management cards 302 and 304). Processing unit 404 is coupled to memory 406 (e.g., synchronous dynamic random access memory (SDRAM)) and single line messaging (SLM) device 402. Processing unit 414 is coupled to memory 416 (e.g., SDRAM) and SLM device 412.

SLM device 402 is coupled to SLM device 412 via single communication wire 426 and backplane connectors 408 and 418. SLM devices 402 and 412 facilitate communication between processing units 404 and 414. In one embodiment, SLM devices 402 and 412 handle transmission and retransmission of messages between processing units 404 and 414. SLM devices 402 and 412 further provide information as to whether transmissions were successful and signal when data has been received for processing units 404 and 414. SLM devices 402 and 412 thus allow processing units 404 and 414 to be free from having to manage sideband communication. Processing units 404 and 414 may store received data in memories 406 and 416.

SLM devices 402 and 412 may communicate over a serial protocol meaning that the number of bits in a packet or message can be expanded or reduced without changing the number of wires and pins used for communication.

In one embodiment, SLM is a low cost serial protocol that can be used for mailbox messaging scheme, packet transfer, and register read/write functionality. SLM can be used by multiple devices on a single wire to provide a messaging or mailbox scheme using a signal communication line called SLDIO (Single Line Data Input/Output).

In one embodiment, up to 8 devices can be connected on a line. It is appreciated that any number of SLM devices may be connected as long as there is sufficient identifier bits (e.g., address bits) to identify each device. In one embodiment, SLM provides a serial physical layer protocol that can run at around 10 Mhz or faster depending on the speed of the reference clock.

It is appreciated that a single communication wire facilitates increased signal integrity because of the simplicity of putting termination on a single communication wire over multiple communication wires. For example, passive circuitry can be put on each side of the single communication wire to help reduce the signal degradation. In addition, the use of a single communication wire reduces the likelihood of interference from other communication wires.

Figure 5:
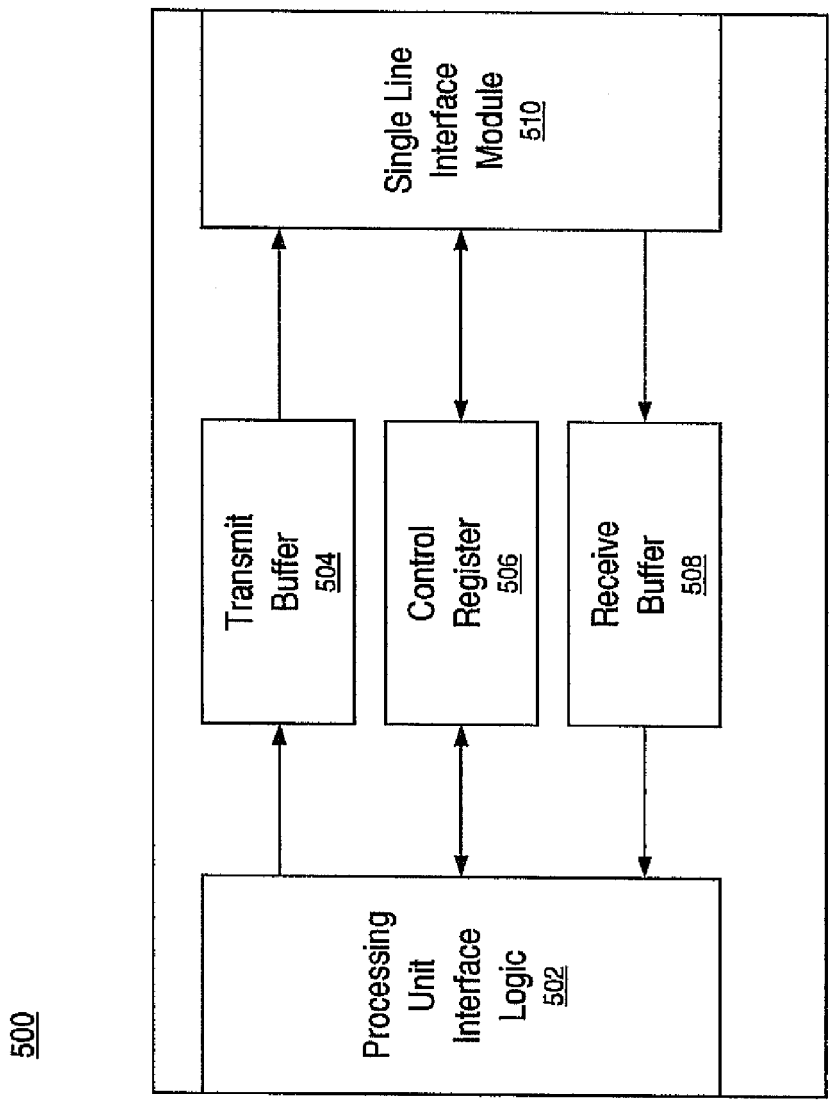
FIG. 5 is a block diagram of an exemplary system in accordance with an embodiment.

FIG. 5 illustrates example components used by various embodiments of the present invention. Although specific components are disclosed in system 500 it should be appreciated that such components are examples. That is, embodiments of the present invention are well suited to having various other components or variations of the components recited in system 500. It is appreciated that the components in system 500 may operate with other components than those presented, and that not all of the components of system 500 may be required to achieve the goals of system 500.

FIG. 5 is a block diagram of an exemplary system in accordance with an embodiment. System 500 includes processing unit interface logic module 502, transmit buffer 504, control register 506, receive buffer 508, and single line interface module 510. In one embodiment, processing unit interface logic module 502 and single line interface module are integrated with a processing component.

Interface logic component 502 is operable to send and receive information from a processing component (e.g., processing units 404 and 414). In one embodiment, interface logic component 502 includes a transmit register and a receive register. The registers of interface logic component 502 allow a processing unit to interface with control register 506 and system 500 handles the communication over the single communication wire. Tables 1 and 2 illustrate exemplary transmit and receiver registers interface logic component 502, respectively.

TABLE 1

Exemplary Mailbox Data Transmit Register

| Bit(s) | Field Name | Description | Default |
|---|---|---|---|
| 28:0 | TX_data | Data transmitted through SLM (Single Line Messaging) protocol. Data [31:0] are written into transmit buffer 504 (e.g., TX FIFO). R/W signal may be set to one. | 0 |
| 31:29 | TX_command | Transmit command. In one embodiment, the transmit Indicates the delimiters of a message. R/W may be set to one. An exemplary message portion indicators:<br>3'h1: Start of Message (SOM)<br>3'h2: Middle of Message (MOM)<br>3'h3: End of Message (EOM)<br>3'h4: Start and End of Message (SOM + EOM) (e.g., for 32-bit data only)<br>Others may be reserved. | 0 |

In one embodiment, the data message may have boundaries with some bits indicating the start of the message, middle of the message, and end of the message respectively. In one embodiment, message based error correction information (e.g., cyclic redundancy check (CRC)) can be used to determine whether a message is coherent or not.

TABLE 2

Exemplary Mailbox Data Receive Register

| Bit(s) | Field Name | Description | Default |
|---|---|---|---|
| 28:0 | RX_data | Data received through SLM (Single Line Messaging) protocol. The data comes from receive buffer (e.g., RX FIFO). In one embodiment, the data can be read only once. A value of 0xFFFF_FFFF may be returned when the FIFO is empty. | 0 |
| 31:29 | RX_command | Receive command. May indicate the delimiters of a message. Read Only.<br>3'h1: Start of Message (SOM)<br>3'h2: Middle of Message (MOM)<br>3'h3: End of Message (EOM)<br>3'h4: Start and End of Message (SOM + EOM) (e.g., for 32-bit data only)<br>Others may be reserved. | 0 |

Transmit buffer 504 receives data from the processing component (e.g., processing units 404 or 414) to be sent. It is appreciated that data may be queued in transmit buffer 504 may occur prior to a send command (e.g., TX command) being issued thereby allowing data to be sent as a group.

Receive buffer 508 is operable to receive data for a processing component (e.g., processing components 404 and 414). In one embodiment, transmit buffer 504 and receive buffer 508 are First In, First Out (FIFO) structures. In one embodiment, transmit buffer 504 and receive buffer 508 facilitate messages larger than 32-bits and use 8 bits to delineate a message (e.g., portions of a message).

Control register 506 stores communication commands and communication results. Control register 506 facilitates transmission, indicates transmission problems, and signals the completion of a transmission. Control register 516 allows control of single line interface module (e.g., a send command) via commands received from a processing component. Control register 506 may provide a processing component (e.g., processing units 404 and 414) with information (e.g., for access by the processing component) as to whether a communication was successful or not. In one embodiment, control register 506 includes a done bit and timeout bit.

TABLE 3

Exemplary Mailbox Control/Status Register

| Bit(s) | Field Name | Description | Default |
|---|---|---|---|
| 0 | TX_enable | Transmit Enable. When set, system 500 transmits the data in transmit buffer 504 (e.g., Mailbox Data Transmit FIFO) and resets the bit R/W. | 0 |
| 1 | TX_timeout | Indicates transmit timeout. Unable to transmit the data due to lack of acknowledgement from destination. Read Only. | 0 |
| 2 | TX_done | Indicates transmit done. Indicates that the transmission is complete or hardware is ready to accept new data to transmit. Read Only. | 0 |

Single line interface module 510 sends and receives data over a single communication line. The single communication line may couple multiple devices together (e.g., 3 devices, 8 devices, or more). In one embodiment, the single communication line is a single wire coupling multiple devices. Single line communication module 510 may facilitate communication between portions of a network device (e.g., management cards 302 and 304) for redundant operations of the network device. In one embodiment, single line interface module 510 comprises a state machine for managing data transmission over the single communication line (e.g., single communication wire).

In one embodiment, single line interface module 510 uses a preamble for sending a clock signal and for recovering a clock signal to send and receive data over the single communication line, respectively. It is appreciated that the preamble does not need to address any specific device. After each SLM device coupled to single line interface module 510 has received the preamble and synchronized its respective clock, each device can determine if the following transmission is for it (e.g., based on a destination identifier).

In one embodiment, single line interface module 510 is operable to send a first acknowledgement upon receiving a destination identifier thereby indicating the device is ready (e.g., present and operational) to receive data. If an SLM device (e.g., system 500) does not receive a destination identifier matching its destination identifier, the SLM device can ignore subsequent communication until another transmission begins (e.g., a preamble is sent). If single line interface module 510, does not receive a first acknowledgement, single line interface module 510 can determine there was a problem with the transmission and retry transmission.

Single line interface module 510 is further operable to send a second acknowledgement, upon receiving a data message, indicating that the message was received correctly. It is appreciated that use of a first and second acknowledgment facilitates increased performance in that the response to transmission failure is determined earlier. For example, if the first acknowledgment is not received, the data portion of the packet is not sent.

The first and second acknowledgements may facilitate or implement a hot swap function for a device coupled to the single communication line. For example, if a device is suddenly disconnected (e.g., management card or network card is pulled from a backplane), the transmitting device will retry transmitting (a configurable or predetermined number of times (e.g., eight times). If an acknowledgement is not received, an indicator (e.g., a bit in control register) will be set which indicates to a processing unit that transmission was unsuccessful.

Single line interface module 510 sends error correction information along with the data, as described herein. In one embodiment, the error correction information comprises cyclic redundancy check (CRC) error correction information.

Single line interface module 510 may further be operable to perform a collision avoidance technique to mange communication between a plurality of devices coupled to single line interface module 510 via the single communication line (e.g., single communication wire). For example, if two SLM devices are trying to access the single communication line at the same time, the SLM devices may back off and retry. In one embodiment, single line interface module 510 performs collision avoidance by utilizing a time slot identifier to deconflict communication over the single communication line (e.g., single communication wire). For example, each SLM device is assigned a time-slot and each SLM device attempts to transmit during its timeslot thereby preventing collisions.

Figure 6:
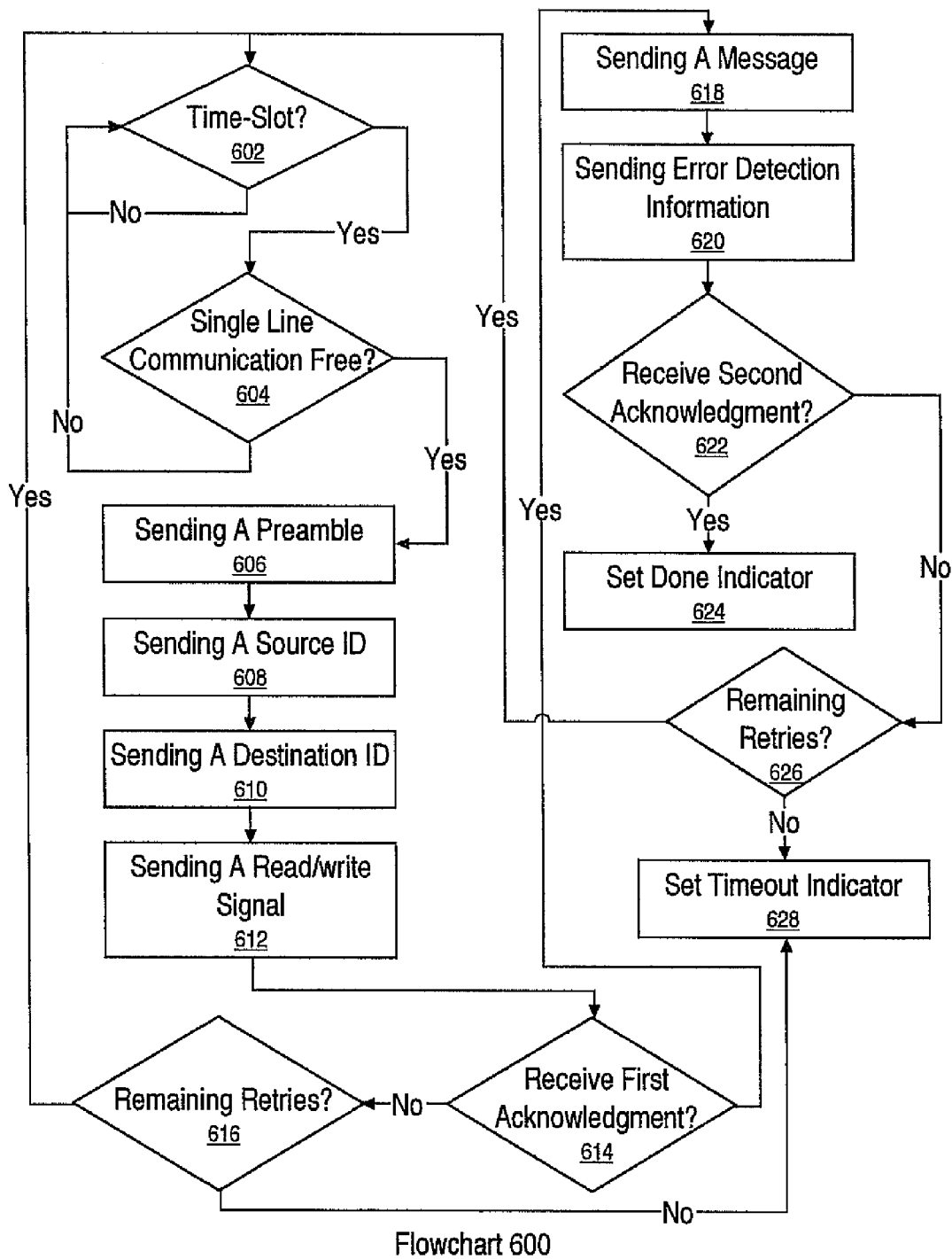
FIG. 6 is an exemplary flowchart of an exemplary method for sending information in accordance with an embodiment.
Figure 7:
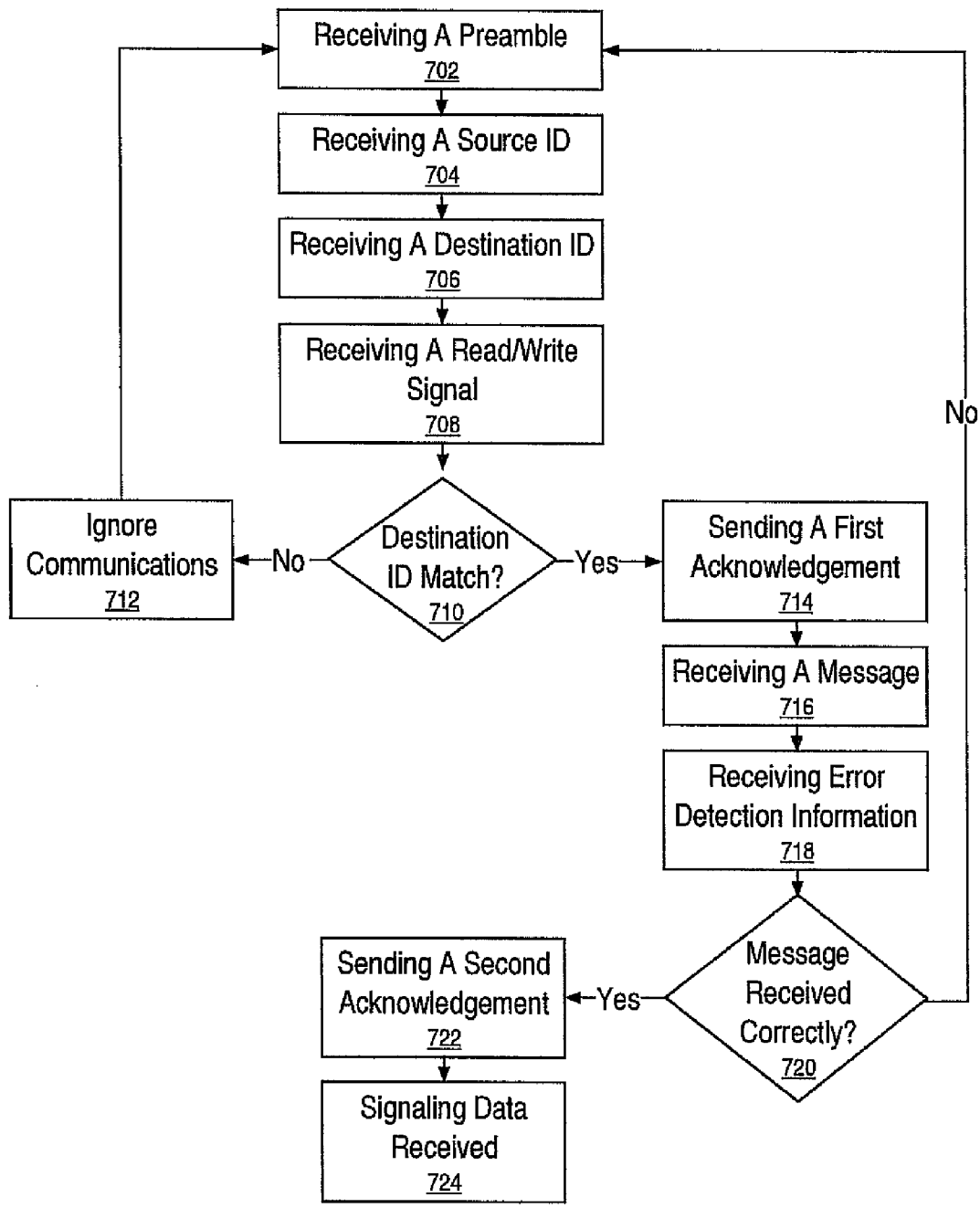
FIG. 7 is a flowchart of an exemplary method for receiving information in accordance with an embodiment.

FIGS. 6 and 7 are flowcharts 600 and 700, respectively, of examples of computer-implemented methods (e.g., executed by a CPU operating on instructions retrieved from a storage medium such as a memory) for single line communication in one embodiment in accordance with the present invention. Although specific steps are disclosed in the flowcharts, such steps are exemplary. That is, embodiments in accordance with the present invention are well-suited to performing various other steps or variations of the steps recited in the flowcharts. The steps in the flowcharts may be performed in an order different than presented.

FIG. 6 is an exemplary flowchart of an exemplary method for sending information in accordance with an embodiment. In one embodiment, flowchart 600 depicts the sending of information over a single communication line (e.g., single communication wire). The single communication line may be a backplane communication line (e.g., coupling management cards and network cards).

In block 602, whether the current time-slot corresponds to the device (e.g., SLM device) trying to send data is checked. If the current time-slot matches the device with data to transmit, block 604 will be performed. If the current time-slot does not match the device with data to transmit, block 602 is performed and the device waits for its time-slot.

In block 604, whether the single communication line is free of communication signals is checked. If there are no communication signals on the single communication line, block 606 may be performed. If there is a communication signal on the single communication line, block 602 is performed.

In block 606, a preamble is sent. As described herein, the preamble is sent over the single communication line (e.g., single communication wire) and is operable to be used for recovering a clock signal.

In block 608, a source identifier (ID) is sent over the single communication line. The source ID is used by the device with a matching destination identifier (ID) to send an acknowledgment to the device with the source ID.

In block 610, a destination ID is sent. As described herein, the destination ID is received by each device coupled to the single communication line and the destination ID is used to by each device to determine whether the following data transmission is intended for it.

In block 612, a read/write signal is sent over the single communication line. In one embodiment, the read/write signal is a single bit which when set corresponds to the data portion of the communication being a write and driven by the sending device. When the read/write bit is reset, the data portion of the communication is a read and is driven by the receiving device.

In block 614, whether a first acknowledgement is received over the single communication line is checked. In one embodiment, the first acknowledgement indicates that there is a receiver present with the destination ID. If a first acknowledgement is received, block 618 is performed. If a first acknowledgement is not received, block 616 is performed.

In block 616, the number of retries remaining is checked against the number of retries thus far. In one embodiment, eight retries are attempted before a device determines that the communication has timed out. If there are remaining retries, block 602 is performed. If there are not remaining retries, block 628 is performed.

In block 618, a message is sent over the single communication line. As described herein, in one embodiment, the message comprises packetized data. In another embodiment, the message comprises a register access command.

In block 620, error detection information is sent over the single communication line. In one embodiment, the error correction information is CRC error detection information.

In block 622, whether a second acknowledgement is received over the single communication line is checked. The second acknowledgement indicates whether the data was received correctly. If a second acknowledgement is received, block 624 is performed. If a second acknowledgment is not received, block 626 is performed.

In block 624, the done indicator (e.g., TX_done) is set indicating that the transmission is complete.

In block 626, the number of retries remaining is checked against the number of retries thus far. In one embodiment, eight retries are attempted before a device determines that the communication has timed out. If there are remaining retries, block 602 is performed. If there are not remaining retries, block 628 is performed.

In block 628, a timeout indicator (e.g., TX_timeout) is set indicating that the data was not able to be transmitted.

FIG. 7 is a flowchart of an exemplary method for receiving information in accordance with an embodiment. In one embodiment, flowchart 700 depicts the receiving of information over a single communication line (e.g., single communication wire). The single communication line may be a backplane communication line or wire (e.g., coupling management cards and network cards).

In block 702, a preamble is received over a single communication line. The preamble is operable to be used for recovering a clock signal and synchronizing the clock of the receiving device. It is appreciated that the preamble is used by each device coupled to the single communication line to synchronize its clock.

In block 704, a source ID is received over the single communication line. As described herein, the source ID identifies the device that sent the preamble and will be sending the destination address.

In block 706, a destination ID is received over the single communication line. As described, herein, each device coupled to the single communication line can use the destination ID to determine whether a message will be sent for it.

In block 708, a read/write signal is received over the single communication line. The read/write signal is used to determine whether the data portion of the packet will be a write or a read. In one embodiment, the read/write signal is a single bit and when it is set it indicates that the data portion of the packet will be a write driven by the sending device. When the read/write bit is reset, it indicates that the read/write portion of packet is a read and is driven by the receiving device.

In block 710, whether the destination ID matches the receiving device's ID (e.g., SLM device ID) is checked. If the destination ID does not match the ID of the device receiving the destination ID, block 712 is performed. If the destination ID matches the device ID, block 714 is performed.

In block 712, communications on the single communication line are ignored until a preamble is received in block 702.

In block 714, a first acknowledgement is sent over the single communication line. As described herein, the first acknowledgement corresponds to a receiver being present with the destination ID previously sent out.

In block 716, a message is received over the single communication line. As described herein, the message may comprise packetized data. As described herein, the message may further comprise an indicator of whether the message is part of a start of a message, middle of the message, or end of message.

In block 718, error detection information is received over the single communication line. As described herein, the error correction may be cyclical redundancy check (CRC) error correction information.

In block 720, whether the message was received correctly is determined. In one embodiment, the message may be determined to have been received correctly based on the error detection information. If the message was received correctly, block 722 is performed. If the message was not received correctly, block 702 is performed.

In block 722, a second acknowledgement is sent over the single communication line. The second acknowledgement is asserted by the received during a write or read and indicates if the data was received correctly. During a read operation, the second acknowledgment may not be used as the transmitting device can request another read if the data was not received correctly.

In block 724, a signal indicating that data has been received is asserted. In one embodiment, an interrupt indicating that data is available to be read is sent to a processing component indicating that data has been received.

Figure 8:
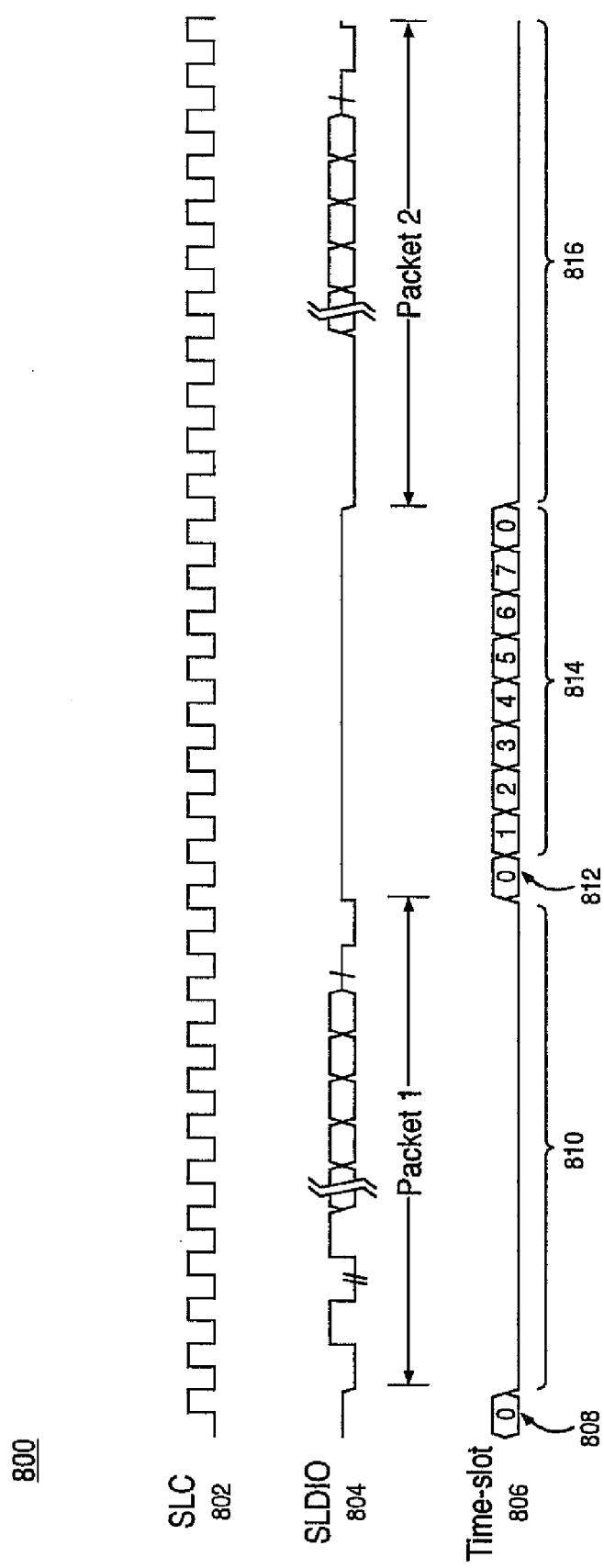
FIG. 8 is an exemplary timing diagram of time-slot arbitration in accordance with an embodiment.

FIG. 8 is an exemplary timing diagram of time-slot arbitration in accordance with an embodiment. Timing diagram 800 includes single line clock (SLC) signal 802, single line data input/output (SLDIO) signal 804, and time-slot timeline 806. In one embodiment, single line clock (SLC) signal 802 is an internal reference clock used to transmit or receive data. To prevent collisions from occurring, a timeslot mechanism is used based on all the devices on a single communication line being substantially synchronized. More specifically, time-slots can be used to prevent collisions because once a packet is received the receiving device can mimic the received clock and use the clock as a reference to get a time-slot.

Each transmitting device is allowed to transmit only if its source ID matches the current time-slot. When a packet transmission is started, the other devices should hold off the single communication line. In the event that a collision occurs, the transmitting device should skip a time-slot before trying to access the line again. In one embodiment, collision avoidance can be based on a back off for a random period scheme.

Time 808 corresponds to time-slot 0. Time range 810 corresponds to sending of a packet by the device (e.g., SLM device) with time-slot 0.

Time 812 corresponds to the skipping of time-slot 0 by the device with time-slot 0 to allow other devices to have fair access to the single communication line. In one embodiment, time-slot information is generated by each device upon reset and post-CRC acknowledgement. Each device will check its time-slot ID and use the corresponding time-slot for qualification before starting to transmit (e.g., a preamble).

Time range 814 corresponds to the qualification of each device to send during its corresponding time-slot. Time range 816 corresponds to the sending of the next packet by the device with time-slot 0.

Figure 9:
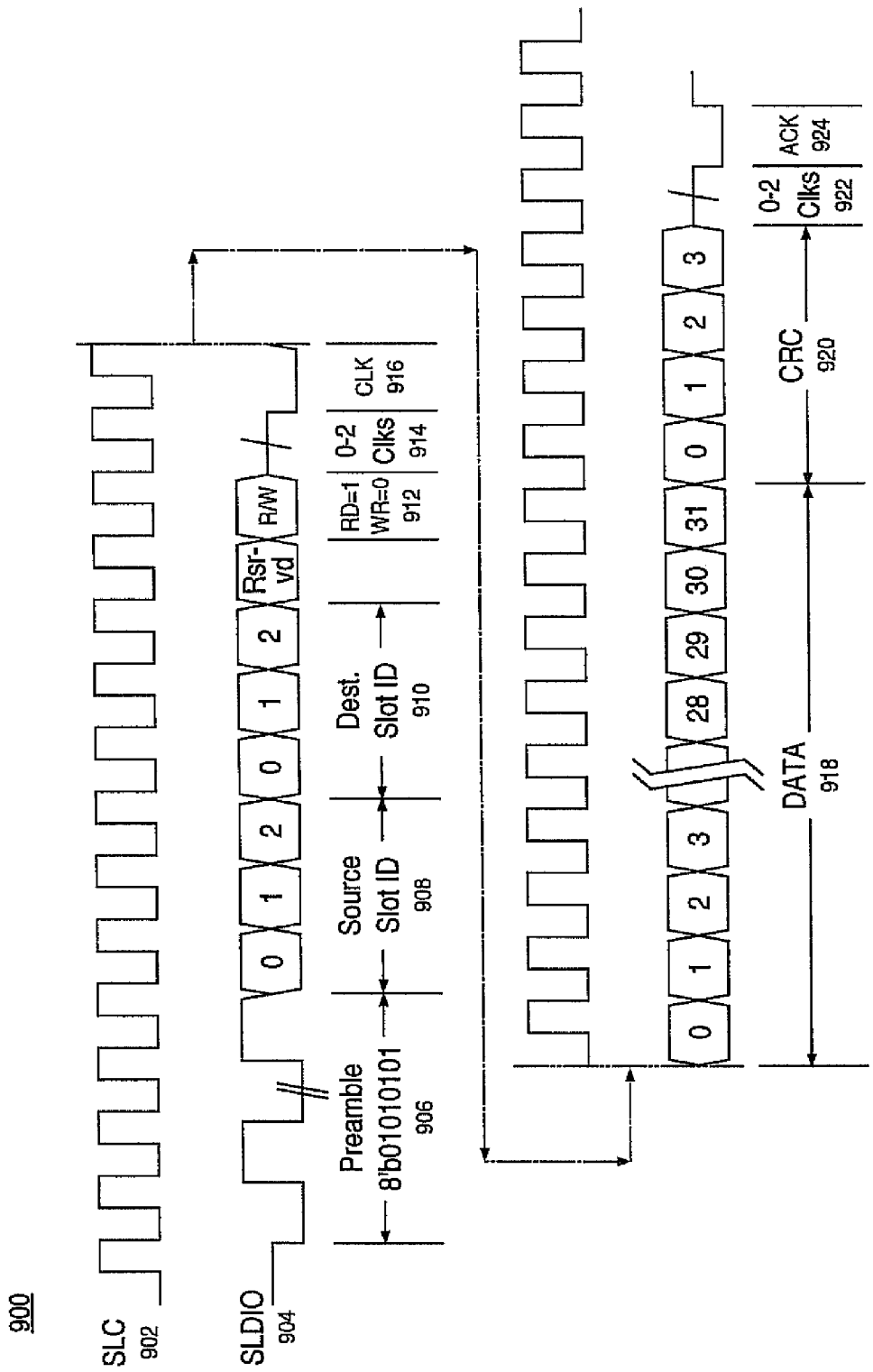
FIG. 9 is an exemplary timing diagram of a transaction in accordance with an embodiment.

FIG. 9 is an exemplary timing diagram of a transaction in accordance with an embodiment. Timing diagram 900 includes single line clock (SLC) 902 and single line data input/output (SLDIO) 904. The signaling of timing diagram 900 may be performed by a sending device during its corresponding time-slot.

In one embodiment, a SLM packet consists of 8 bits of preamble, 3 bits of source ID, 3 bits of destination ID, 1 read/write control bit, 32 bits of data and 4 bits of CRC. SLM can be used for fixed 32-bit packet transfer for low cost applications. In a fixed 32-bit packet mode, the R/W bit may be fixed to a write value (e.g., set).

During time range 906, a preamble is sent over the single communication line. As described herein, the preamble allows receiving devices to recover the clock signal that will be used to send data. More specifically, the preamble may be a toggling pattern used by the receiving device to synchronize with and capture the incoming packet. The slower single line clock (SLC) signal 902 is used internally for transmitting and receiving data. The transmitter uses its SLC signal 902 to transmit the data during a write. All of the receiving devices listening to the single communication line detect the preamble pattern and lock their internal clocks to the transmitting device's clock. In one embodiment, the locking can occur on a per packet basis and SLC signal 902 can stay active on the receiving device for the duration of the packet and get reliably regenerated for every packet.

Time range 908 corresponds to the sending of a source identifier (ID) over the single communication line. As described here, the source ID is used by the receiving device to identify the transmitting device and thus used to direct acknowledgements to the transmitting device.

Time range 910 corresponds to sending of a destination identifier (ID) over the single communication line. The destination ID allows a receiving device to identify that a communication is to be send to the device. That is, the receiving devices check the destination ID to determine if the packet is addressed to them. If a device receives a destination ID which does not match its device ID, subsequent communications on the single communication line do not need to be processed as the communications are for another device.

In one embodiment, SLM can be used for reading and writing registers. For two devices, this can be done by replacing the Source ID and Destination ID with an address field. For multiple devices, the register address can be embedded in the data field or portion.

Time range 912 corresponds to the sending of a read/write control signal over the single communication line. When the read/write control is set the data portion of the packet is a write and is driven by the transmitting device (e.g., the device with the source ID). When the read/write control is reset, the data portion of the packet is a read which is driven by the receiving device (e.g., device with the destination ID).

Time range 914 corresponds to clock signals that allocated for a receiving device to process the previous transmission. In one embodiment, time range 914 corresponds to 0-2 clock cycles. After the receiving device has processed the transmission thus far, the device may send a first acknowledgement during time range 916. The first acknowledgement is driven by the receiving device and indicates that there is a receiving device present with the destination ID. The transmitting device only transmits the packets or expects read data in the event of receiving a first acknowledgement.

Upon receiving a first acknowledgement that the source ID and destination ID was received, the data or message, as described herein, is sent over the single communication line. Time range 918 corresponds to sending the data portion of a packet. During a write the data is driven by the transmitting device. During a read the receiving device transmits the data. In one embodiment, the data portion is 32 bits. It is appreciated that the data portion of a transmission may be of any length.

After the data is sent, error correction information may be sent over the single communication line during time range 920. In one embodiment, the error correction information is CRC information. The CRC code may be a 4-bit field calculated for the address/control byte and 4 bytes of data. The error correction information is used to ensure the integrity of the packet.

During time range 922, the receiving device is provided time to process the transmission. In one embodiment, time range 922 is 0-2 clock cycles. During time range 924, upon successful receiving of the data and error correction information, a second acknowledgment is received over the single communication line. In one embodiment, the second acknowledgement is asserted by the receiver during a write or a read.

Figure 10:
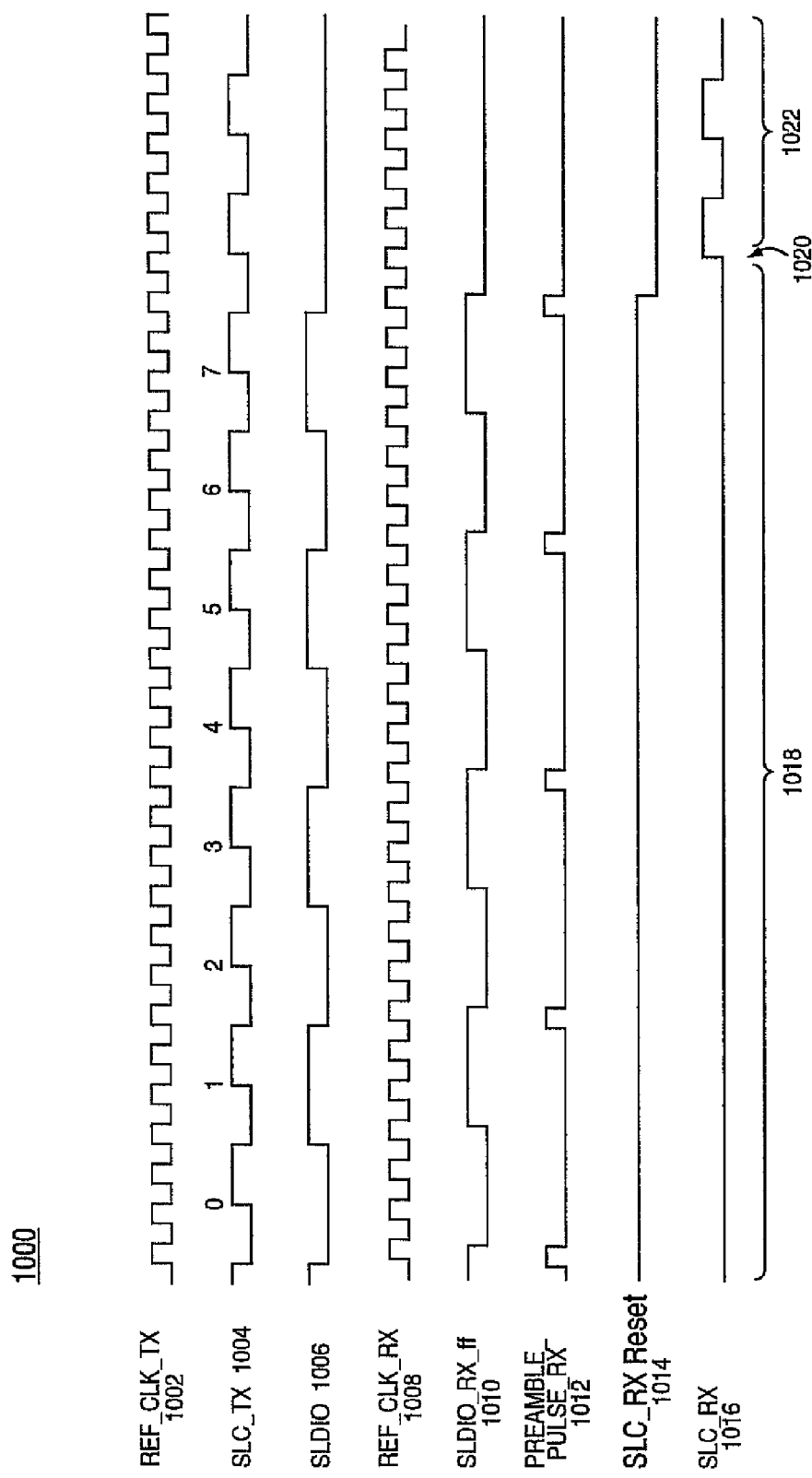
FIG. 10 is an exemplary timing diagram of clock synchronization in accordance with an embodiment.

FIG. 10 is an exemplary timing diagram of clock synchronization in accordance with an embodiment. Timing diagram 1000 illustrates the use of a preamble for synchronizing of transmit and receive clocks for transmitting data over a single communication line. More specifically, timing diagram 1000 illustrates single line clock (SLC) generation at the receiving device based on the preamble from the transmitting device. Timing diagram 1000 includes transmission reference clock (REF_CLK_TX) signal 1002, single line clock transmit (SLC_TX) signal 1004, single line data input/output (SLDIO) signal 1006, receiver reference clock (REF_CLK_RX) signal 1008, single line data input/output receive (SLDIO_RX_ff) signal 1010, preamble pulse receive (PREAMBLE_PULSE_RX) signal 1012, single line clock receive reset (SLC_RX Reset) signal 1014, and single line clock receive (SLC_RX) signal 1016.

Time range 1018 corresponds to sending of a preamble which is used to synchronize SLC_RX signal 1016 to SLC_TX signal 1004. The transmitting device uses a higher speed transmit reference clock REF_CLK_TX signal 1002 to generate the SLM packet prefaced by a preamble timed by an internally generated transmit SLC_TX signal 1004. The packet appears on the SLDIO line as SLDIO signal 1006.

The receiving device uses a sufficiently higher speed reference clock REF_CLK_RX signal 1008 to sample the preamble and the rest of the packet. SLC_RX Reset signal 1014 is high while the preamble is sent. The clock style transitions of the preamble generate pulses PREAMBLE_PULSE_RX 1012 that is used to kick start receive SLC clock SLC_RX signal 1016 after the completion of the preamble. More specifically, based on the transition from one to zero the receiving device can recreate the clock.

Time 1020 corresponds to where the SLC_RX signal 1016 is synchronized to SLC_TX signal 1004. Time range 1022 corresponds to where packets can be received by the receiving device.

According to embodiments of the present invention, single line communication (e.g., over a single communication wire) and messaging is provided. Use of a single communication line thus conserves valuable connector pins. Embodiments of the present invention may facilitate redundancy via sideband communication over a backplane. Embodiments of the present invention further provide for asynchronous communication, clock synchronization via preamble, error detection, packetized data messages, multiple acknowledgements, collision detection, and support hot swapping.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for communicating information, comprising:
   an interface logic component for sending and receiving information for a processing component; and
   a first single line interface module for sending and receiving data over a single communication wire for said interface logic component, wherein said single line interface module is operable for using a first preamble for sending a first clock signal and operable for using a second preamble to recover a second clock signal, wherein said first preamble corresponds to a sending operation over said single communication wire and said second preamble corresponds to a receiving operation over said single communication wire, wherein a first network device comprises said first single line interface module that implements sideband communication between said first network device and a second network device comprising a second single line interface module, and wherein said first network device and said second network device are coupled to a first and a second backplane connector respectively, wherein said first backplane connector and said second backplane corrector are operable for network communication and said sideband communication, and wherein said first network device is operable to manage network traffic among a plurality of components.

2. The system as described in claim 1, wherein said single line interface module further comprises a state machine for managing data transmission of said single line interface module.

3. The system as described in claim 1, further comprising:
   a control register for controlling said single line interface module, wherein said control register receives commands from said processing component, and wherein said control register is further for storing a communication result for access by said processing component.

4. The system as described in claim 1, wherein said single line interface module sends a first acknowledgement over said single communication wire upon receiving a matching destination identifier, wherein said first acknowledgement acknowledges the presence and operation of said system for communicating information.

5. The system as described in claim 4, wherein said single line interface module sends a second acknowledgement over said single communication wire upon receiving a data message.

6. The system as described in claim 5, wherein said first acknowledgement and said second acknowledgement implement a hot swap function for a device coupled to said single communication wire.

7. The system as described in claim 1, wherein said single line interface module sends error correction information with said data over said single communication wire, wherein said error correction information comprises cyclic redundancy check (CRC) error correction information.

8. The system as described in claim 1, wherein said interface logic component and said single line interface module are integrated with said processing component.

9. The system as described in claim 1, wherein said single line interface module performs a collision avoidance technique to manage communication between a plurality of devices coupled to said single line interface module via said single communication wire.

10. The system as described in claim 9, wherein said collision avoidance technique comprises time slot identification to deconflict communication over said single communication wire.

11. A method for sending information, comprising:
    sending a first preamble from a first single line communication module, wherein said first preamble is operable for recovering a first clock signal, and said preamble is sent over a single communication wire wherein said first preamble corresponds to a sending operation over said single communication wire;
    sending a destination identifier, wherein said destination identifier is sent over said single communication wire; and
    sending a message over said single communication wire, wherein said message comprises packetized data wherein a first network devices comprises said first single line communication module that implements sideband communication between said first network device and a second network device comprising a second single line interface module, and wherein said first network device and said second network device are coupled to a first and second backplane connector respectively, wherein said first backplane connector and said second backplane connector are operable for network communication and said sideband communication, and wherein said first network device is operable to manage network traffic among a plurality of components.

12. The method of claim 11, further comprising:
    sending a read/write signal over said single communication wire.

13. The method of claim 11, wherein said single communication wire is a backplane communication wire.

14. The method of claim 11, wherein said message is sent in accordance with a time slot in accordance with a time slot identifier.

15. The method of claim 11, wherein said message is sent in accordance with a collision avoidance technique.

16. The method of claim 11, further comprising:
    in response to not receiving a first acknowledgement, resending said destination identifier over said single communication wire.

17. The method of claim 16, further comprising:
    in response to not receiving a second acknowledgement, resending said message over said single communication wire; and
    sending error detection information over said single communication wire.

18. A tangible non-transitory computer-readable medium having computer-executable code stored thereon for performing a method for sending and receiving information, said method comprising:

receiving a first preamble in a first single line interface module, wherein said first preamble is operable for recovering a first clock signal and said first preamble is received over a single communication wire and wherein said first single line interface module is operable for using a second preamble signal for sending a second clock and wherein said first preamble corresponds to a receiving operation over said single communication wire and said second preamble corresponds to a sending operation over said single communication wire wherein a first network device comprises said first single line interface module that implements sideband communication between said first network device and a second network device comprising a second single line interface module, and wherein said first network device and said second network device are coupled to a first and second backplane connector respectively, wherein said first backplane connector and said second backplane connector are operable for network communication and said sideband communication, and wherein said first network device is operable to manage network traffic among a plurality of components;

receiving a destination identifier over said single communication wire;

sending a first acknowledgement over said single communication wire, wherein said first acknowledgement corresponds to being able to receive a message;

receiving a message over said single communication wire, wherein said message comprises packetized data;

receiving error detection information over said single communication wire; and sending a second acknowledgement over said single communication wire, wherein said second acknowledgment corresponds to correctly receiving said message.

19. The tangible non-transitory computer-readable medium of claim 18, wherein said method further comprises:

sending an interrupt to a processing component indicating that data has been received via said single communication wire.

* * * * *